United States Patent [19]
Beverett

[11] 3,748,999
[45] July 31, 1973

[54] AUTOMATIC DRIPOLATOR, SINGLE COMPARTMENT

[76] Inventor: James H. Beverett, c/o Commonwealth-Tumpane Co. Ltd., Box 91 APO, New York, N.Y. 09038

[22] Filed: Nov. 30, 1971

[21] Appl. No.: 203,322

Related U.S. Application Data

[63] Continuation-in-part of Ser. No. 140,707, May 6, 1971, Pat. No. 3,696,733.

[52] U.S. Cl. ................................................. 99/313
[51] Int. Cl. ............................................ A47j 31/00
[58] Field of Search ..................... 99/307, 313, 314, 99/315, 304, 316, 318, 319, 320, 322

[56] References Cited
UNITED STATES PATENTS
3,527,153   9/1970   Orlando ............................... 99/315

Primary Examiner—Robert W. Jenkins
Attorney—Harvey B. Jacobson

[57] ABSTRACT

A non-recycling coffee maker incorporating a vertically sliding separator which divides a single compartment pot into segregated upper and lower chambers. The lower chamber receives the water which is pumped upwardly through a central delivery tube for discharge downwardly through a coffee receiving basket into the upper chamber. The separator rides downwardly on the decreasing water level in the lower chamber, maintaining the separation of the chambers and simultaneously increasing the liquid capacity of the upper chamber for an accommodation of the brewed coffee. Elastomeric seals are provided between the separator and both the central delivery tube and the interior chamber wall with both seals being capable of flexing without such distortion as will allow the passage of liquid thereby.

13 Claims, 13 Drawing Figures

PATENTED JUL 31 1973    3,748,999

AUTOMATIC DRIPOLATOR, SINGLE COMPARTMENT

This application is a continuation-in-part of my co-pending application U.S. Ser. No. 140,707, filed May 6, 1971, now U.S. Pat. No. 3,696,733.

The present invention broadly relates to improvements in electrically operated coffee makers, and is more particularly concerned with non-recycling coffee makers wherein a sliding separator is used so as to maintain a complete segregation of the water and brewed coffee within a single divided compartment.

The advantages of a non-recycling coffee making procedure, as well as the utilization of a sliding separator within a single compartment, are well known, the procedure itself being widely recognized as producing coffee of both improved flavor and aroma. The use of a sliding separator is significant in that a single compartment can be divided into two separate chambers, the sizes of which are directly variable in relation to each other with the overall size of the coffee maker being no larger than that of a conventional coffee maker wherein a recycling of the brewed coffee is effected. The bulkiness and corresponding additional expense in non-recycling coffee makers utilizing two separately constructed compartments is avoided.

The non-recycling principle of pumping near-boiling water upwardly from the lower side of a sliding separator through the coffee grains and onto the upper side of the separator, the separator slowly descending so as to accommodate the increase in liquid content of the upper chamber, has been known for many years, note for example the 1912 German Pat. No. 260,028, as well as the recent U.S. Pat. No. 3,527,153, issued Sept. 8, 1970. However, while these, as well as other patents, teach the general principle of using a sliding separator, it is believed that until the instant invention, no practical solution to the necessity of providing for a complete segregation between the chambers, particularly when a central delivery tube is used, has been devised. The seals heretofore used would, by their very nature, allow for seepage or leakage between the compartments to a greater or lessser extent and thus inherently result in less than maximum results such as can only be maintained by complete separation. Thus, it is a primary object of the instant invention to provide a separator assembly which ensures complete and perfect separation of the brewed coffee from the water at all stages of the brewing process.

A further object of the invention is to provide a separator which, through the provision of unique peripheral seal means, is adapted for use within a coffee pot having a contoured configuration, that is an exterior, and corresponding chamber, which is other than completely cylindrical as heretofore required so as to maintain anything close to a proper sealing relationship.

Other advantages of the invention reside in the provision of a separator which, while of a highly unique construction, is basically simple, capable of trouble-free operation and easily mounted and removed as required.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
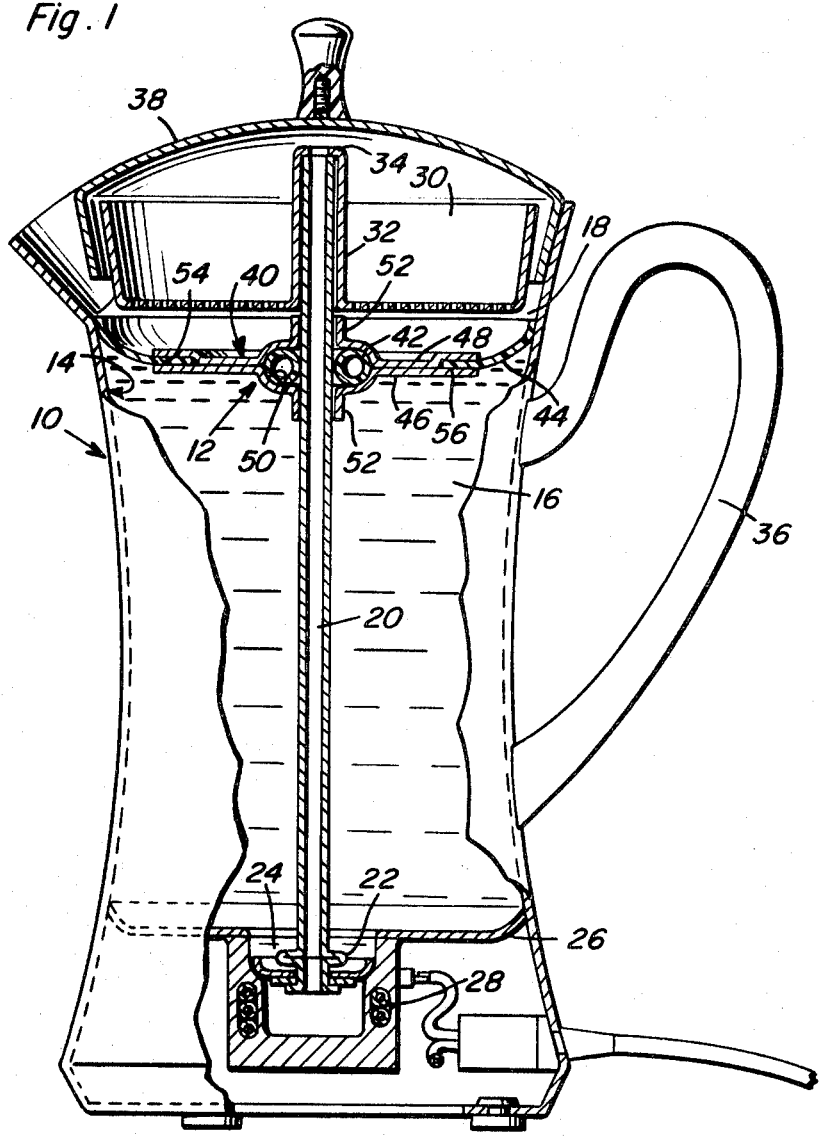
FIG. 1 is an elevational view, partially in section, of a coffee maker or dripolator incorporating the features of the instant invention, the separator being positioned at the upper part of the single compartment.

Referring now more specifically to the drawings, reference numeral 10 is used to designate a percolating type coffee maker typical of that with which the separator of the instant invention can be used. The separator itself is designated by reference numeral 12.

The separator 12, as will be described in more detail subsequently, is particularly adapted to accommodate itself to variations in the internal diameter of the single compartment 14 of a coffee maker 10. In order to emphasize this feature, the illustrated coffee maker has been shown with a restricted central portion, however other curvatures or designs can be used as desired so as to provide for variations in the external aesthetic appearance of the coffee maker while still utilizing the non-recycling system. This constitutes a distinct improvement over the systems heretofore utilized in that prior separators required a substantially cylindrical interior throughout the full height of the chamber in order to maintain a semblance of a seal.

The separator 12 divides the single compartment 14 into variable size lower and upper chambers 16 and 18, the sizes of which vary in direct proportion to each other during the brewing cycle. The separator 12 is received about a central delivery tube 20 engaged with and projecting upwardly from a conventional pump valve unit 22 which is in turn positioned within a central well 24 provided in the bottom 26 of the compartment 14. As in a conventional coffee maker, an appropriate heating unit 28 with conventional thermostatic controls and warming element will be provided. A bottom perforated coffee grind receiving basket 30, including an upwardly projecting central sleeve 32, is mounted on the upper end of the delivery tube 20. The sleeve 32 is telescopically received over the upper end of the tube 20 and has the upper ends thereof slightly inturned, as at 34, so as to overlie the upper periphery of the tube 20 and thereby support the basket 30. Handle 36 and lid 38 complete the basic coffee maker construction.

Turning now specifically to the separator 12, the unique construction thereof ensures the maintenance of perfect separation between the lower and upper chambers 16 and 18, the lower chamber receiving the clear water with the upper chamber accommodating, in a non-recycling manner, the brewed coffee. The separator 12, as preveiously indicated, also, through its unique construction, permits variable diameters within the body compartment.

Basically, the separator 12 includes a rigid annular body 40, an inner seal 42 and an outer seal 44. The body 40 is formed of annular lower and upper plates 46 and 48. The two plates 46 and 48, when interlocked as by spot-welding, define an annular inwardly directed semi-circular recess 50 the lower and upper edges of which terminate in laterally directed sleeve portions 52. Each of the plates 46 and 48 define one-half of the recess 50 and the corresponding sleeve portion 52. A second recess 54 is provided completely about the outer periphery of the body 40, this recess 54 being narrow and relatively deep, formed by upwardly offsetting the outer edge portion of the upper plate 48.

The sealing of the separator 12 to the central delivery tube 20 is effected by the inner seal 42 which is in the nature of an annular hollow elastomeric gasket compressed between the recess forming portions of the plates 46 and 48 or bonded therein to provide a watertight seal. This gasekt 42 projects slightly inward of the sleeve portions 52 so as to compressively engage the delivery tube 20 in a manner so as to provide an effective water seal thereabout while at the same time allowing for a sliding of the separator under the combined actions of the slight vacuum generated in the lower chamber 16 and the weight of the brewed coffee introduced into the upper chamber 18. The two sleeve portions 52 are of particular significance in engaging the delivery tube along a portion of the length thereof both above and below the separator so as to provide for a substantial degree of stability and ensure a proper horizontal orientation of the separator 12 throughout its full range of movement.

Figure 2:
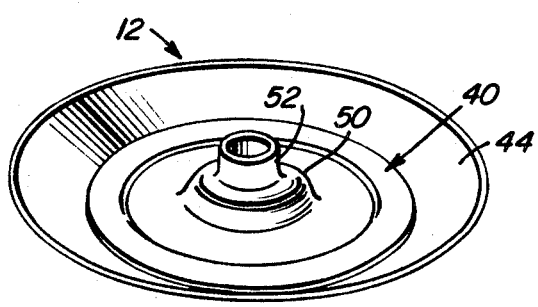
FIG. 2 is a perspective view of the separator.
Figure 3:
FIG. 3 is a top plan view of the inner delivery tube seal.

The outer seal 44 is also in the nature of an elastomeric gasket incorporating a relatively high degree of flexible resiliency. The outer seal or gasket, annular in construction, has the inner peripheral portion 56 thereof sealed within the outer body recess 54 in a water-tight manner with the remainder of the seal 44 projecting outwardly and upwardly beyond the body in a flaring or inverted conical manner. This will best be noted from FIGS. 1 and 2, the seal 44 in FIG. 1 being slightly inwardly flexed from its original position due to sealing engagement with the compartment wall. If so desired, this upward and outward forming of the seal 44 can follow a slight curvature, shaped somewhat in the nature of a bowl. The purpose of the preforming of the outer seal or gasket 44 into an upward flared configuration, as compared to a flat gasket which is only deformed upwardly due to engagement against the compartment wall, is to provide for a substantial increase in the ability of the seal to maintain a sealed engagement with the compartment wall when variations in the diameter of the wall are encountered. The conventional flat gasket will upon encountering variations in the diameter of the wall, such as could arise both intentionally for design purposes or inadvertently due to manufacturing tolerances, will tend to irregularly deform about its outer periphery and cause breaks in the seal and consequent commingling of the brewed coffee with the water. This tendency to irregularly deform or buckle under more than extremely minor variations greatly restricts the use of the flat outer gasket. However, the increased uniform compressibility or compressibility without deformation achieved by the preformed flared gasket of the instant invention enables the accommodation of substantial peripheral compression without leakage.

Figure 4:
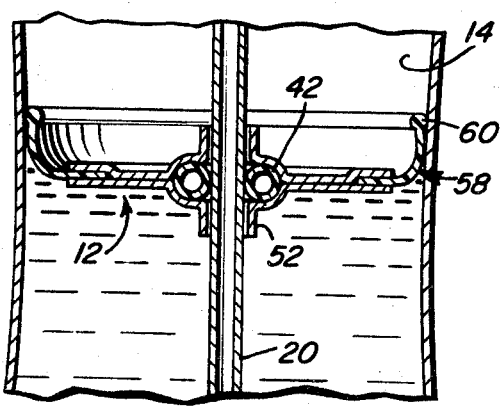
FIG. 4 is a partial cross-sectional detail of the coffee maker with a slightly modified form of separator located at approximately mid-height therein.
Figure 5:
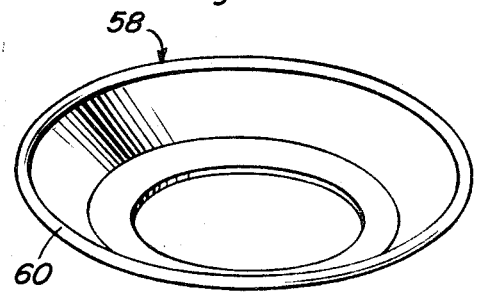
FIG. 5 is a perspective view of the outer seal of the separator of FIG. 4.

With reference to FIGS. 4 and 5, a slightly different form of outer separator seal 58 has been illustrated. This seal 58, configured and mounted in the same manner as the seal 44, differs from the seal 44 in that an enlarged integral bead 60 is provided peripherally about the outer edge. This bead, of the same elastic material as the seal 58 itself, strengthens the annular wall of the seal 58, particularly when subjected to compressive forces, and assists in maintaining the edge portion of the seal 58 against my undesirable irregular deformation as the seal is contracted when moving through restricted portions of the compartment 14. It will be noted that, in FIG. 4, the separator, also designated by reference numeral 12, has moved to approximately mid-height within the narrowing central portion of the compartment 14 thus resulting in an increased compressive flexing of the outer seal 58. FIG. 5 is of particular interest in that it, in perspective, shows the basic configuration of the outer seal, this basic configuration being the same for both seal 58 and seal 44.

Figure 6:
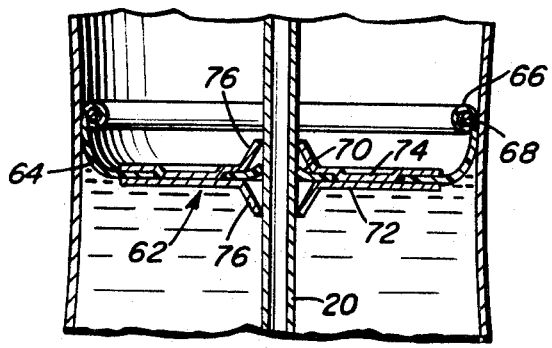
FIG. 6 is a cross-sectional view similar to FIG. 4 with a further variation of separator utilized therein.
Figure 7:
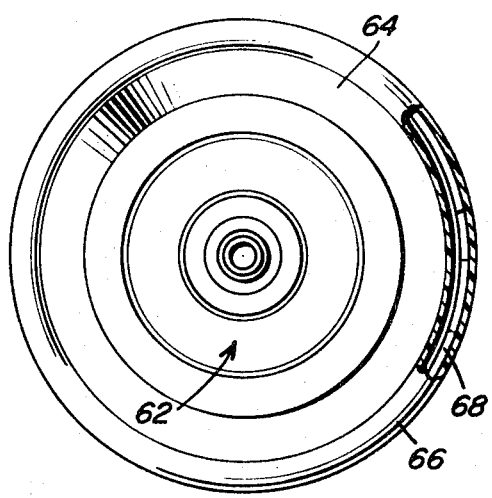
FIG. 7 is a plan view, with a portion broken away for purposes of illustration, of the separator of FIG. 6.
Figure 8:
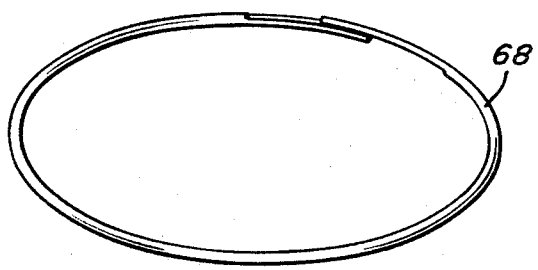
FIG. 8 illustrates one form of seal maintaining spring utilized with the separator of FIG. 6.
Figure 9:
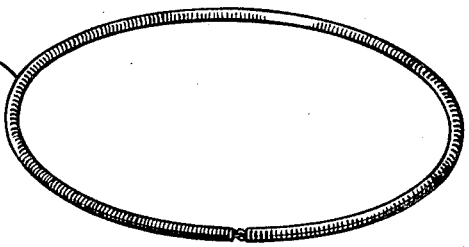
FIG. 9 illustrates a second form of seal biasing spring utilized with the separator of FIG. 6.

FIG. 6 illustrates an alternate form of separator, designated by reference numeral 62. The separator 62 includes an outer seal 64 which, while of the same basic configuration illustrated in FIG. 5, includes a hollow bead 66 about the outer periphery thereof. This hollow bead 66 receives an annular compression spring 68, either in the nature of a leaf spring as in FIG. 8 or a coil spring as in FIG. 9. The use of such a spring at the outer periphery of the seal 64 ensures a proper spring-loaded engagement of the elastomeric seal edge against the compartment wall regardless of design or manufacturing variations therein within the limit of the seal itself. The use of a positive force applying spring 68, as will be appreciated, will increase the ability of the outer seal 64 to closely follow contour changes and maintain a proper sealing relationship.

The inner seal 70 of the separator 62 is in the nature of a flat elastomeric disk having a central opening therethrough of a slightly smaller diameter than that of the central delivery tube 20. This elastomeric disk 70 has the outer periphery thereof sandwiched between the superimposed plates 72 and 74 which comprise the central rigid body of the separator 62. Both of the plates 72 and 74 have the inner peripheries thereof laterally directed to define conical sleeve-like portions 76, each terminating in a circular opening which closely and slidably receives the central delivery tube 20 therethrough. Thus, the separator, through the sleeve portions 76, slidably engages the delivery tube at laterally spaced points to the opposite sides of the main body and both above and below the flexible inner seal 70. In this manner, a substantial degree of stability is introduced into the separator throughout its range of vertical movement. At the same time, the separator is positively maintained centered on the delivery tube so as to ensure a proper engagement therewith by the central seal 70, the ability of the outer seal 64 to conform to irregularities or contour variations accommodating any slight off-center location of the delivery tube 20 which might accidentally occur. Incidentally, it will be noted that both sleeve portions 76 combine to provide an enlarged chamber within which the inner seal 70 is free to flex, thereby facilitating the accommodation of this seal to the delivery tube 20 in positive sealing engagement.

Figure 10:
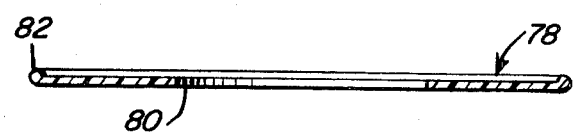
FIG. 10 illustrates a further variation in the outer seal.
Figure 11:
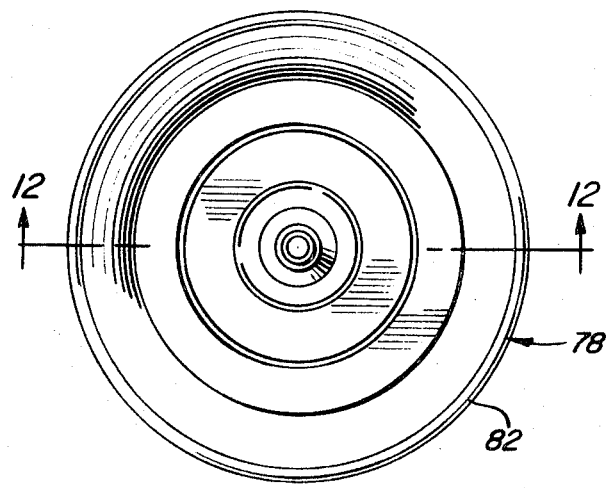
FIG. 11 is a top plan view of a separator incorporating the outer seal of FIG. 10.
Figure 12:
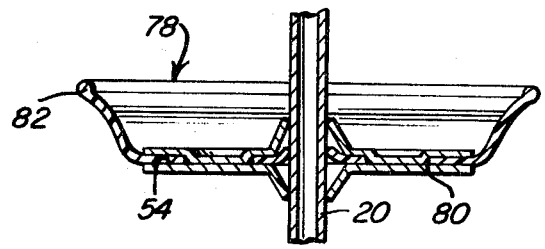
FIG. 12 is a cross-sectional detail through the separator of FIG. 11 illustrating the configuration assumed by the stretched outer seal.

FIG. 10 is a cross-sectional view through a flat annular elastomeric outer seal or gasket 78. This seal 78, noting FIGS. 11 and 12, is mounted about the rigid body of a separator with the inner peripheral portion thereof sealed between the body defining upper and lower plates. It will be appreciated that the inner periphery 80 of the seal 78 is of a lesser diameter than the inner diameter of the outer body recess 54. Thus, when the outer seal 78 is mounted on the separator body, as indicated in FIGS. 11 and 12, the seal 78 will be stretched outwardly from the inner periphery thereof which in turn will cause a regular inverted conical deformation thereof into a configuration closely approximating that of the previously described outer seal whereby the advantages inherent in such a configuration can be achieved not withstanding the fact that the seal 78 is initially formed flat. It will be noted that the seal 78 also includes an integrally formed enlarged or beaded reinforcing rim 82 about the outer periphery thereof. The seal 78, formed in this manner, constitutes a significant improvement over the conventionally used flat circular gasket in that the assumed conical shape and reinforcing rim 82 assures sufficient pressure against the walls of the coffee maker compartment to minimize irregular deformation. The particular advantages of this type of seal 78 include simplicity in manufacture while at the same time providing for a greater ability to accommodate compression without irregular deformation. Such a seal could be effectively used in coffee makers wherein the internal compartment is of a constant diameter throughout the height thereof or wherein the diametric differences are such as to require the greater accommodating ability of the flared separators heretofore described.

Figure 13:
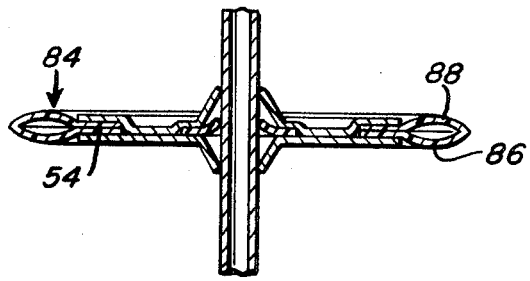
FIG. 13 illustrates yet a further variation of the outer seal.

FIG. 13 is an cross sectional view through yet another form of separator wherein a variation in the outer seal 84 is provided for use in conjunction with the central rigid separator body and flexible inner seal illustrated in both FIGS. 6 and 12.

The outer seal 84 is basically what might be considered a double conical construction consisting of duplicate reversed lower and upper sections 86 and 88. The lower section, prior to mounting on the central body, is of a configuration closely approximating that shown in FIG. 5. The upper section 88 is of a similar although inverted configuration. The outer peripheries of the two sections 86 and 88 are joined with the two sections 86 and 88 in fact being integrally formed. In mounting the outer seal 84, thus formed, the inner peripheries of the two portions 86 and 88 are compressed together, stretched outwardly and snapped within the peripheral body groove 54, thus forming an annular gasket of an oblong tubular cross section which can easily compress and expand so as to accommodate itself to the varying interior of a coffee pot without irregular deformation. Inasmuch as the outer seal 84 is in the nature of a double seal, utilizing two flexible portions 86 and 88, it will be appreciated that thinner material than that associated with the previously described outer seals can be used. Thus in turn will improve the uniform compressibility of the seal. If so desired, a compression spring can be provided within the integrally joined outer peripheries of the sections 86 and 88.

In using the aforedescribed coffee maker construction in brewing coffee, normally all the inner components of the coffee maker are removed and water placed in the compartment. Appropriate coffee grains will also be placed in the basket. The delivery tube and valve unit are then positioned in the well and the separator slide over the delivery tube until it rests on the water level within the compartment. The coffee grain basket is then mounted on top of the delivery tube and the lid fitted in place. The water is then heated in any suitable manner and, at the appropriate time, flows upwardly through the delivery tube and moves downwardly through the coffee grains into the upper chamber. As the pumping continues, the separator is drawn downwardly by the vacuum created by the water displacement in the lower chamber. This downward movement of the separator is encouraged by the weight of the brewed coffee being introduced into the upper chamber. The aforedescribed positive seals maintain a complete separation between the two chambers which in turn results in achieving the maximum in both flavor and aroma. The conventionally supplied controls will deactivate the heating unit at the appropriate time and, if applicable, activate an appropriate warming element to maintain the temperature of the brewed coffee until used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use in a non-recycling single compartment coffee maker, a dual chamber defining separator, said separator comprising a rigid generally flat body insertable horizontally within the compartment of a coffee maker, said body defining a central opening for the accommodation of a delivery tube therethrough, an inner elastomeric seal mounted on said body and projecting inwardly of said opening peripherally thereabout, said body including an outer periphery and an outer elastomeric seal mounted on said body and projecting outwardly thereof about the outer periphery, said outer seal including an enlarged outer edge completely thereabout for engagement with the wall of a compartment receiving the separator, said outer seal edge incorporating a greater resistance to inward flexing than the outer seal inward of the outer edge thereof.

2. The separator of claim 1 wherein said outer seal is inclined outwardly and upwardly at an angle to the body to define a generally conical configuration.

3. The separator of claim 2 wherein said body includes an inner portion which projects inwardly relative to the central opening in laterally spaced overlying relation to the inner seal to the opposite sides thereof for stabilizing engagement with a centrally received delivery tube.

4. The separator of claim 3 wherein the enlarged outer edge of the outer seal includes a compression spring effecting a constant outward bias completely thereabout.

5. The separator of claim 4 wherein the body comprises upper and lower plates sandwiching portions of the inner and outer seals therebetween for a mounting thereof.

6. The separator of claim 5 wherein each of said plates is substantially flat and includes a perpendicularly projecting sleeve-like extension about the inner periphery thereof, said extensions projecting in opposed aligned relation to each other and defining the aforementioned inner portion for stabilizing engagement with a delivery tube.

7. A separator of claim 5 wherein each of said plates is substantially flat and includes a laterally directed conical central portion, the conical portions of the two plates extending in opposed aligned relation to each other and defining an enlarged inner seal receiving area therebetween, said conical portions comprising said inner portion for stabilizing engagement with a delivery tube.

8. The separator of claim 1 wherein said body includes an inner portion which projects inwardly relative to the central opening in laterally spaced overlying relation to the inner seal to the opposite side thereof for stabilizing engagement with a centrally received delivery tube.

9. The separator of claim 1 wherein said inner elastomeric seal comprises an annular hollow gasket-like member.

10. For use in a non-recycling single compartment coffee maker, a dual chamber defining separator, said separator comprising a rigid generally flat body insertable horizontally within the compartment of a coffee maker, said body defining a central opening for the accommodation of a delivery tube therethrough, an inner elastomeric seal mounted on said body and projecting inwardly of said opening peripherally thereabout, said body including an inner portion which projects inwardly relative to the central opening in laterally spaced overlying relation to the inner seal to the opposite sides thereof for stabilizing engagement with a centrally received delivery tube, said body including an outer periphery and an outer elastomeric seal mounted on said body and projecting outwardly thereof about the outer periphery for engagement with the wall of a compartment receiving the separator.

11. The separator of claim 10 wherein said outer seal includes overlying flexible upper and lower portions, said upper and lower portions including integrally joined outer peripheries and engaged inner peripheries secured to the outer periphery of the separator body, said outer seal portions being interiorly separated between the outer and inner peripheries thereof so as to define a tubular configuration.

12. The separator of claim 10 wherein said inner elastomeric seal comprises an annular hollow gasket-like member.

13. For use in a non-recycling single compartment coffee maker, a dual chamber defining separator, said separator comprising a rigid generally flat body insertable horizontally within the compartment of a coffee maker, said body defining a central opening for the accommodation of a delivery tube therethrough, an inner elastomeric seal mounted on said body and projecting inwardly of said opening peripherally thereabout, said body including an outer periphery, and an outer elastomeric seal mounted on said body and projecting outwardly therefrom about the outer periphery, said outer seal including overlying flexible upper and lower portions, said upper and lower portions including integrally joined outer peripheries and engaged inner peripheries secured to the outer periphery of the separator body, said outer seal portions being interiorly separated between the outer and inner peripheries thereof so as to define a tubular configuration.

* * * * *